United States Patent
Vom Stein et al.

(10) Patent No.: US 9,004,493 B2
(45) Date of Patent: Apr. 14, 2015

(54) SEAL ARRANGEMENT AND HINGE OF A CHAIN WITH THE SEAL ARRANGEMENT

(71) Applicant: AB SKF, Gothenburg (SE)

(72) Inventors: Hans-Joachim Vom Stein, Odenthal (DE); Wolfgang Korte, Cologne (DE); Marcus Stojek, Much (DE)

(73) Assignee: AB SKF, Gothenburg (SE)

( * ) Notice: Subject to any disclaimer, the term of this patent is extended or adjusted under 35 U.S.C. 154(b) by 0 days.

(21) Appl. No.: 13/846,581

(22) Filed: Mar. 18, 2013

(65) Prior Publication Data

US 2013/0264862 A1    Oct. 10, 2013

Related U.S. Application Data

(63) Continuation of application No. 11/631,359, filed as application No. PCT/EP2005/006882 on Jun. 27, 2005, now Pat. No. 8,485,926.

(30) Foreign Application Priority Data

Jun. 30, 2004   (DE) .................. 10 2004 031 941

(51) Int. Cl.
| | | |
|---|---|---|
| *F16J 15/34* | (2006.01) | |
| *F16J 15/32* | (2006.01) | |
| *F16G 13/02* | (2006.01) | |
| *B62D 55/088* | (2006.01) | |
| *B62D 55/15* | (2006.01) | |

(52) U.S. Cl.
CPC ............ *B62D 55/0887* (2013.01); *B62D 55/15* (2013.01)

(58) Field of Classification Search
CPC ........... F16G 13/06; F16G 13/04; F16G 5/18; F16G 13/02; F16G 13/18; F16J 15/344; F16J 15/36; F16J 15/3456; B62D 55/0887; B62D 55/15
USPC .......... 277/384, 573, 549, 381; 305/103, 104; 474/205, 206
See application file for complete search history.

(56) References Cited

U.S. PATENT DOCUMENTS 2,736,584 A * 2/1956 Riesing .......................... 277/573
3,022,081 A * 2/1962 Kosatka ........................ 277/353
(Continued)

FOREIGN PATENT DOCUMENTS

| DE | 27 26 033 A1 | 12/1977 |
| DE | 28 08 658 C2 | 2/1983 |

(Continued)

OTHER PUBLICATIONS

International Search Report issued Oct. 21, 2005 by the European Patent Office in International Application No. PCT/EP2005/006882.

*Primary Examiner* — Henry Liu
(74) *Attorney, Agent, or Firm* — Buchanan Ingersoll & Rooney PC

(57) ABSTRACT

A sealing arrangement used to create a seal between a first part of a chain and a second part of the chain, wherein the second part can at least be pivoted in relation to the first part, includes a sealing ring with an annular sealing lip for sealing a lubricant area between parts which can be pivoted towards each other, and an elastic ring which is adapted to be fixed to one of the parts and which is adapted to exert pressure in the sealing ring. In addition, a supporting ring is arranged between the sealing ring and the elastic ring.

18 Claims, 1 Drawing Sheet

(56) References Cited

U.S. PATENT DOCUMENTS

| | | | | |
|---|---|---|---|---|
| 3,218,107 A * | 11/1965 | Reinsma | | 305/104 |
| 3,614,113 A * | 10/1971 | Burk | | 277/384 |
| 3,838,862 A * | 10/1974 | Fern | | 277/400 |
| 3,841,718 A * | 10/1974 | Reinsma | | 305/103 |
| 4,089,531 A * | 5/1978 | Roley et al. | | 305/103 |
| 4,094,516 A * | 6/1978 | Morley et al. | | 305/103 |
| 4,132,418 A * | 1/1979 | Roli | | 277/382 |
| 4,195,852 A * | 4/1980 | Roley et al. | | 277/380 |
| 4,209,204 A * | 6/1980 | Wagner et al. | | 305/103 |
| 4,240,642 A * | 12/1980 | Roussin | | 305/103 |
| 4,248,439 A * | 2/1981 | Haslett | | 277/380 |
| 4,262,914 A * | 4/1981 | Roley | | 277/381 |
| 4,274,682 A * | 6/1981 | Livesay | | 305/103 |
| 4,275,890 A * | 6/1981 | Reinsma | | 277/384 |
| 4,284,281 A * | 8/1981 | Reinsma | | 277/384 |
| 4,331,339 A * | 5/1982 | Reinsma | | 305/103 |
| 4,364,572 A * | 12/1982 | Yamamoto et al. | | 277/380 |
| 4,392,657 A * | 7/1983 | Roley | | 277/383 |
| 4,457,521 A * | 7/1984 | Morley | | 305/103 |
| 4,469,336 A * | 9/1984 | Linne | | 277/402 |
| 4,504,066 A * | 3/1985 | Horl | | 277/399 |
| 4,607,854 A * | 8/1986 | Bissi et al. | | 277/402 |
| 4,688,805 A * | 8/1987 | Crotti et al. | | 277/381 |
| H1180 H * | 5/1993 | Arianoutsos et al. | | 277/381 |
| 5,390,997 A * | 2/1995 | Nakaishi et al. | | 305/103 |
| 5,763,956 A * | 6/1998 | Metz et al. | | 305/102 |
| 5,794,940 A * | 8/1998 | Brueggmann | | 277/364 |
| 6,322,082 B1 * | 11/2001 | Paykin | | 277/549 |
| 6,726,212 B2 * | 4/2004 | Oldenburg | | 277/353 |
| 6,783,129 B2 * | 8/2004 | Akita et al. | | 277/349 |
| 6,955,359 B2 * | 10/2005 | Yamamoto et al. | | 277/565 |
| 7,121,555 B2 * | 10/2006 | Yamamoto et al. | | 277/565 |
| 7,159,871 B2 * | 1/2007 | Oldenburg | | 277/353 |
| 7,367,739 B2 * | 5/2008 | Brock et al. | | 403/39 |

FOREIGN PATENT DOCUMENTS

| | | |
|---|---|---|
| DE | 27 26 033 C2 | 1/1987 |
| DE | 28 37 640 C2 | 10/1991 |
| GB | 1 408 517 A | 10/1975 |
| WO | 01/13015 A1 | 2/2001 |

* cited by examiner

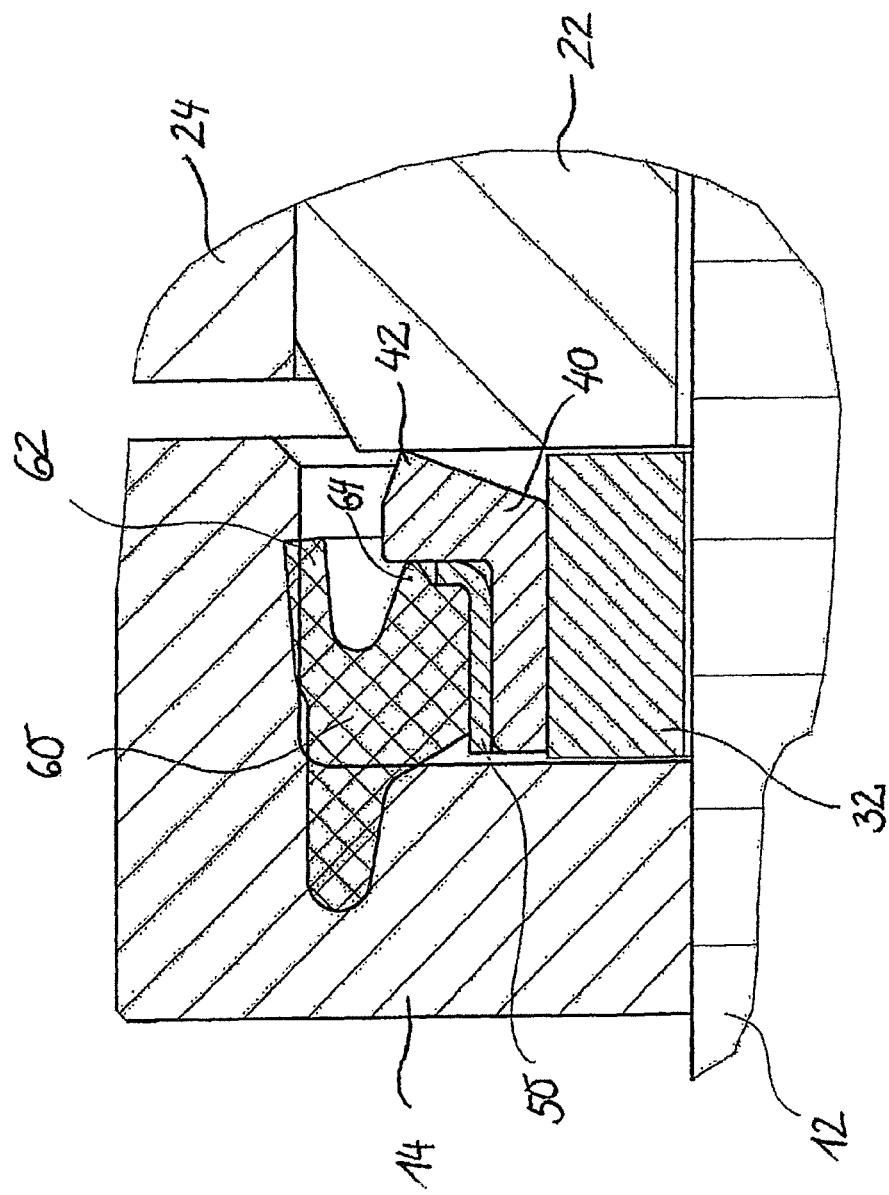

SEAL ARRANGEMENT AND HINGE OF A CHAIN WITH THE SEAL ARRANGEMENT

This application is a continuation of U.S. application Ser. No. 11/631,359 having a filing date of Jun. 4, 2007 which is a U.S. national stage application based on International Application No. PCT/EP05/06882 filed on Jun. 27, 2005 and which claims priority to German Application No. 102004031941.3 filed on Jun. 30, 2004, the entire content of all three of which is incorporated herein by reference.

TECHNICAL FIELD

The invention relates to a seal arrangement for sealing between a first part of a chain and a second part of a chain which can be at least pivoted relative to the first and the hinge of a chain with the seal arrangement.

BACKGROUND DISCUSSION

In chains especially of chained vehicles, ordinarily the links of the chain are interconnected via pivot hinges. In this connection this pivot hinge comprises a pin and a sleeve which is pushed with a swiveling capacity over the pin, with the links of the chain being pressed on the ends of the pin and the sleeve. The rotary bearing surfaces between the pin and the sleeve are lubricated by an oil chamber in the pin, the oil space between the pin and sleeve being sealed by two seal elements which comprises sealing lips which press against the front surfaces of the sleeve.

For example, DE 27 26 033 A1 discloses a chain pin arrangement with a seal, the chain pin arrangement comprising a chain pin with a part of a first chain link attached to the chain pin and a sleeve which can be moved back and forth relative to the pin and which surrounds one part of the chain pin, with a part of a second chain link attached to the sleeve. Furthermore the chain pin arrangement comprises a hollow made in the first chain link for holding the seal which is provided with its sealing lip for adjoining the front side of the sleeve, and a spacer ring which surrounds the chain pin, which extends in the axial direction between the front surface of the hollow and the front surface of the sleeve and its outer peripheral surface together with the front surface of the sleeve and the hollow forms a cavity for holding the seal. In this connection, the seal which has been inserted into the cavity comprises a main sealing ring of comparatively stiff, but elastic first elastomer material and an auxiliary seal element of a second elastic elastomer material which is much less stiff than the first material.

U.S. Pat. No. 4,607,854 discloses a seal arrangement for a chain pivot hinge in which there are a first ring of flexible elastomer material having a sleeve-like part and a flange-like part with a sealing lip, and a second sleeve which surrounds the first touching ring of elastic material for sealing the space between the pin and the sleeve surrounding the pin. Here the first ring comprises a cylindrical, metallic stiffening ring which is embedded completely in the sleeve-like part of the first ring.

The object of the invention is to devise a seal arrangement for sealing between the first part of the chain and a second part of the chain which can be at least pivoted relative to the first, and which has especially a long service life.

A seal arrangement for sealing between the first part of the chain and a second part of the chain which can be at least pivoted relative to the first contains the following features:

a sealing ring with an annular sealing lip for sealing the lubricant space between the parts which can be pivoted against one another, an elastic ring for securely adjoining one of the parts and for applying pressure to the sealing ring and a support ring located between the sealing ring and the elastic ring.

The invention is based on the finding that for a conventional seal arrangement in which the elastic ring interacts directly with the sealing ring, the elastic ring when installed is deformed as intended such that it produces forces both in the axial and also radial direction, the radially acting forces after a certain time causing the sealing ring to be pressed by creep effects onto the cylindrical jacket-like opposing surface on the pin or spacer ring, so that the seal arrangement becomes immovable and can no longer equalize the axial tolerances; this ultimately causes leaks. Another contributing effect is the deformation of the sealing ring which forms upon axial movements of the pin or spacer ring as a result of the radially acting forces in conjunction with the friction of the sealing ring on the pin or spacer ring. The invention avoids the aforementioned adverse effects by inserting between the sealing ring and elastic ring a support ring with which the high radial forces are captured.

Because the support ring is simply placed between the sealing ring and the elastic ring during installation, the entire seal arrangement can be easily and thus economically produced. The seal arrangement achieves a much longer service life compared to comparable conventional seal arrangements at production costs which are roughly the same or even lower.

In one advantageous embodiment the support ring, the elastic ring, and the sealing ring are made matched to one another such that the elastic ring together with the sealing ring seals the support ring to the outside. This advantageously prevents penetration of moisture from the outside to the support ring so that the support ring especially when made as a metal ring is protected from corrosion.

In one advantageous configuration the elastic ring is made to form an annular sealing lip which upon proper deformation of the elastic ring when viewed from the outside is designed to adjoin one of the parts of the chain in front of the sealing lip of the sealing ring. This advantageously prevents penetration of dirt from the outside in the direction of the sealing lip of the sealing ring.

Other advantages, features and details of the invention will become apparent from the embodiment of the invention described below using the FIGURE.

BRIEF DESCRIPTION OF THE DRAWING FIGURE

The drawing FIGURE is a longitudinal cross-sectional view of a seal arrangement for sealing between a first part of a chain and a second part of the chain which can be at least pivoted relative to the first.

DETAILED DESCRIPTION

The drawing FIGURE shows as one embodiment of the invention a longitudinal section through a seal arrangement for sealing between a first part of a chain and a second part of the chain which can be at least pivoted relative to the first. The drawing FIGURE shows simply by way of extract the top, leftmost region of the longitudinal section, the right region which is not shown being made as a mirror image of the illustrated region with respect to the vertical axis.

The first part of the chain comprises a pin 12 and an outer chain link 14 which is pressed on the pin 12 with its cylindrical holes. The second part of the chain comprises a sleeve 22 which can be at least pivoted against the pin 12 and which has been pushed over the pin 12 with radial play, and an inner chain link 24 which is pressed on the sleeve 22 with its cylindrical holes. Furthermore, with axial play between the outer chain link 14 and the sleeve 22 there is a spacer ring 32 pushed over the pin 12 with radial play.

A sealing ring 40 is pushed over the spacer ring 32 and is made to seal the oil-filled space extending essentially between the outer surface of the pin 12 and the inside surface of the sleeve 22, forming a sealing lip 42 which properly seals against the front surface of the sleeve 22. Furthermore the sealing ring 40 lies against the outside surface of the spacer ring 32 over a large area and is made to form essentially L-shaped cross sectional surfaces. In the direction to the outer chain link 14, a correspondingly inserted support ring 50 is connected to the sealing ring 40. The support ring is metal and is likewise made to form essentially L-shaped cross sectional surfaces. Finally an elastic ring 60 which in the undeformed state forms essentially Y-shaped cross sectional surfaces is inserted following the support ring 50.

The sealing ring 40 here comprises an elastomer material, especially polyurethane, and can be made fiber-reinforced. The elastic ring 60 likewise comprises an elastomer material, especially rubber, and is less stiff than the sealing ring 40. The metal support ring 50 is much stiffer than the sealing ring 40.

The radially outer branch of the Y-shape of the elastic ring 60 pointing axially to the inside forms a sealing lip 62 which is in front of the sealing lip 42 of the sealing ring 40 viewed from the outside and which is designed to adjoin the front surface of the sleeve 22 with proper deformation of the elastic ring 60.

In order to stop corrosion of the metal support ring 50 by moisture penetrating from the outside, the support ring 50, the elastic ring 60 and the sealing ring 40 are matched to one another such that the support ring 50 in the base area of the L-shape extends radially less far to the outside than the sealing ring 40, and the elastic ring 60 forms a further annular sealing lip 64 which projects in the axial direction and which is designed to seal against the front surface of the sealing ring 40 in order to thus seal the support ring 50 against effects from the outside.

In the drawing FIGURE, the first and second parts of the chain and the spacer ring 32 are properly mounted, conversely especially the elastic ring 60 but also the sealing ring 40 are shown in a still undeformed state which arises before the two parts of the chain are pushed together. When the two parts of the chains are properly mounted, as shown in the drawing FIGURE, the elastic ring 60 is strongly deformed, by which the elastic ring 60 rests tightly against the outer chain link 14, but at the same time via the support ring 50 presses the sealing ring 40 with its inner surface against the outer surface of the spacer ring 32 and the sealing lip 42 against the front surface of the sleeve 22. Furthermore, in this way the sealing lip 62 of the elastic ring 60 is pressed against the front surface of the sleeve 22 and the other sealing lip 64 of the elastic ring 60 is pressed against the sealing ring 40.

The invention claimed is:

1. A seal arrangement providing a seal between a first part of a chain and a second part of the chain which is at least pivotable relative to the first part of the chain about an axis, comprising:
   an L-shaped sealing ring positioned between the first and second parts, the sealing ring comprising an annular sealing lip for sealing a lubricant space between the first part and the second part which is at least pivotable relative to the first part, the sealing ring including an axially-extending portion with a radially outwardly facing surface;
   an elastic ring securely adjoining the first part or the second part and applying pressure to the sealing ring, the elastic ring including a radially inwardly facing surface facing radially toward the radially outwardly facing surface; and
   a support ring configured to be in physical contact with the sealing ring and the elastic ring, the support ring including an axially extending section stiffer than both the sealing ring and the elastic ring and located radially between the radially outwardly facing surface of the axially-extending portion of the sealing ring and the radially inwardly facing surface of the elastic ring for preventing a direct radial pressing of the elastic ring on the sealing ring, the support ring including a radially innermost surface in physical contact with the radially outwardly facing surface of the axially-extending portion of the sealing ring and wherein an entirety of a radially outermost surface of the support ring is in physical contact with the radially inwardly facing surface of the elastic ring.

2. The seal arrangement according to claim 1, wherein the support ring is positioned between the sealing ring and the elastic ring when the seal arrangement is assembled.

3. The seal arrangement according to claim 1, wherein the elastic ring comprises an annular sealing lip which, upon deformation of the elastic ring when viewed from outside, adjoins one of the first and second parts of the chain in front of the sealing lip of the sealing ring.

4. The seal arrangement according to claim 3, wherein the elastic ring in an undeformed state is Y-shaped.

5. The seal arrangement according to claim 4, wherein the sealing lip of the elastic ring is a radially outer branch of the Y-shape pointed axially toward an inside direction.

6. The seal arrangement according to claim 1, wherein the support ring, the elastic ring, and the sealing ring are matched to one another such that the elastic ring together with the sealing ring seals the support ring to outside.

7. The seal arrangement according to claim 1, wherein the support ring is L-shaped.

8. The seal arrangement according to claim 1, wherein the first part of the chain comprises a pin and at least one outer chain link pressed on one end of the pin, and the second part of the chain comprises a sleeve which is pivotable on the pin and pushed onto the pin and at least one inner chain link which has been pressed onto one end of the sleeve.

9. The seal arrangement according to claim 8, further comprising a spacer ring between the outer chain link and the sleeve on the pin.

10. The seal arrangement according to claim 9, wherein the sealing lip of the sealing ring and/or the elastic ring contact a front side of the sleeve.

11. The seal arrangement according to claim 9, wherein an inside surface of the sealing ring is arranged on an outside surface of the spacer ring.

12. The seal arrangement according to claim 8, wherein the elastic ring contacts two different surfaces of the outer chain link.

13. The seal arrangement according to claim 1, wherein the sealing ring is stiffer than the elastic ring.

14. The seal arrangement according to claim 1, wherein the sealing ring comprises an elastomer material.

15. The seal arrangement according to claim 1, wherein the elastic ring comprises an elastomer material.

16. The seal arrangement according to claim 1, wherein the support ring is made of metal, the sealing ring is made of polyurethane and the elastic ring is made of rubber.

17. A hinge of a chain assembly comprising the seal arrangement according to claim 1.

18. The seal arrangement according to claim 1, wherein the annular sealing lip of the sealing ring includes a radially outwardly facing surface which is positioned farther from the axis than a radially outermost portion of the support ring.

* * * * *